United States Patent
Nath et al.

(10) Patent No.: US 11,788,724 B1
(45) Date of Patent: Oct. 17, 2023

(54) ACOUSTIC DAMPER FOR COMBUSTOR

(71) Applicant: General Electric Company, Schenectady, NY (US)

(72) Inventors: Hiranya Nath, Bengaluru (IN); Ravindra Shankar Ganiger, Bengaluru (IN); Michael A. Benjamin, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/929,360

(22) Filed: Sep. 2, 2022

(51) Int. Cl.
| | |
|---|---|
| *F23R 3/00* | (2006.01) |
| *F23R 3/04* | (2006.01) |
| *F02C 7/045* | (2006.01) |

(52) U.S. Cl.
CPC ............. *F23R 3/002* (2013.01); *F02C 7/045* (2013.01); *F23R 3/04* (2013.01); *F05D 2240/35* (2013.01); *F05D 2260/96* (2013.01); *F23R 2900/00014* (2013.01)

(58) Field of Classification Search
CPC .... F23R 3/002; F23R 3/04; F23R 3/16; F23R 3/50; F23R 2900/00014; F02C 7/045
See application file for complete search history.

(56) References Cited

U.S. PATENT DOCUMENTS

| | | | | |
|---|---|---|---|---|
| 3,958,416 | A | | 5/1976 | Hammond, Jr. et al. |
| 4,413,477 | A | | 11/1983 | Dean et al. |
| 4,787,208 | A | * | 11/1988 | DeCorso ................ F23C 6/045 60/753 |
| 4,819,438 | A | * | 4/1989 | Schultz .................... F23M 5/08 165/83 |
| 5,025,622 | A | * | 6/1991 | Melconian ................ F23R 3/50 60/39.464 |
| 5,127,221 | A | * | 7/1992 | Beebe ...................... F23R 3/34 60/754 |
| 5,319,935 | A | | 6/1994 | Toon et al. |
| 5,735,126 | A | * | 4/1998 | Schulte-Werning ...... F23R 3/26 431/350 |
| 6,513,334 | B2 | | 2/2003 | Varney |
| 6,845,621 | B2 | * | 1/2005 | Teets ...................... F02C 3/085 60/749 |
| 7,389,643 | B2 | * | 6/2008 | Simons ................... F23R 3/005 60/737 |
| 8,028,528 | B2 | | 10/2011 | Burd et al. |

(Continued)

*Primary Examiner* — Alain Chau
(74) *Attorney, Agent, or Firm* — Venable LLP; Edward Kmett; Michele V. Frank

(57) ABSTRACT

A combustor liner has an outer liner and an inner liner that define a combustion chamber therebetween, the combustion chamber having a dilution zone. The outer liner and the inner liner each have a converging-diverging section extending into the dilution zone of the combustion chamber and form a throat between them. A bridge member extends across the converging-diverging sections to form a damper cavity therebetween. Each of the converging-diverging sections includes at least one dilution opening defined through the respective converging-diverging section at the throat, and includes a damper inlet feed member on a downstream portion of the converging-diverging section, so that an acoustic damper is defined by the converting-diverging section, the bridge, and the damper inlet feed. The acoustic damper dampens acoustic characteristics of the combustor.

20 Claims, 8 Drawing Sheets

(56) References Cited

U.S. PATENT DOCUMENTS

| | | | |
|---|---|---|---|
| 8,707,708 B2* | 4/2014 | Wagner | F23R 3/002 |
| | | | 60/755 |
| 9,322,553 B2 | 4/2016 | Parsania et al. | |
| 9,404,654 B2 | 8/2016 | Cunha et al. | |
| 10,514,171 B2* | 12/2019 | Wagner | F23R 3/50 |
| 2004/0211188 A1* | 10/2004 | Alkabie | F23M 20/005 |
| | | | 60/725 |
| 2005/0144954 A1* | 7/2005 | Lemon | F23R 3/002 |
| | | | 60/752 |
| 2005/0229581 A1* | 10/2005 | Bellucci | F23R 3/286 |
| | | | 60/39.17 |
| 2008/0041058 A1* | 2/2008 | Johnson | F23M 20/005 |
| | | | 60/725 |
| 2009/0053054 A1 | 2/2009 | Grooms et al. | |
| 2010/0058763 A1* | 3/2010 | Rubio | F23M 9/06 |
| | | | 60/737 |
| 2012/0272654 A1* | 11/2012 | Kaleeswaran | F23R 3/002 |
| | | | 60/722 |
| 2013/0206500 A1* | 8/2013 | Ono | F23R 3/002 |
| | | | 181/213 |
| 2014/0033728 A1* | 2/2014 | Marmilic | F02C 7/141 |
| | | | 60/722 |
| 2015/0059345 A1* | 3/2015 | Hellat | G06F 30/00 |
| | | | 60/725 |
| 2015/0096829 A1* | 4/2015 | Bothien | F23R 3/16 |
| | | | 181/204 |
| 2015/0113992 A1* | 4/2015 | Tonon | F23M 20/005 |
| | | | 60/725 |
| 2015/0159878 A1* | 6/2015 | Schildmacher | F23R 3/58 |
| | | | 60/776 |
| 2017/0108216 A1* | 4/2017 | Taniguchi | B23P 6/002 |
| 2017/0299182 A1* | 10/2017 | Miyauchi | F23R 3/46 |
| 2020/0333001 A1* | 10/2020 | Dyszkiewicz | F23M 20/005 |

* cited by examiner

ACOUSTIC DAMPER FOR COMBUSTOR

TECHNICAL FIELD

The present disclosure relates to an acoustic damper for a combustor of a gas turbine engine.

BACKGROUND

In a combustion section of a turbine engine, a fuel-air mixture is ignited to generate combustion products, and, in some combustors, air flows through an outer passage surrounding an outer liner and an inner passage surrounding an inner liner, and is diverted through dilution holes in the outer and inner liners into a combustion chamber as dilution air. Combustion of the fuel-air mixture and mixing of the dilution air with combustion products may produce thermo-acoustic oscillations in the combustor, resulting in high noise levels and mechanical distress during operation of the turbine engine.

BRIEF DESCRIPTION OF THE DRAWINGS

Features, advantages, and embodiments of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In a combustion section of a turbine engine, a fuel-air mixture is ignited to generate combustion products, and, in some combustors, air flows through an outer passage surrounding an outer liner and an inner passage surrounding an inner liner, and is diverted through dilution holes in the outer and inner liners into the combustion chamber as dilution air. The combustion of the fuel-air mixture and mixing of the dilution air with the combustion products may produce thermo-acoustic oscillations, resulting in high noise levels and mechanical distress during operation of the turbine engine.

The present disclosure aims to dampen some of the thermo-acoustic characteristics by providing the outer and inner liners with integrated Helmholtz resonating dampers in a combustor liner having a converging-diverging structure. According to one aspect of the present disclosure, a combustor that includes an annular combustor liner has an outer liner and an inner liner that define a combustion chamber therebetween, the combustion chamber having a dilution zone. The outer liner and the inner liner each have a converging-diverging section extending into the dilution zone of the combustion chamber, and form a throat between them. A bridge member extends across the converging-diverging sections to form a damper cavity therebetween. Each of the converging-diverging sections includes at least one dilution opening defined through the respective converging-diverging section at the throat, and includes a damper inlet feed member on a downstream portion of the converging-diverging section. An acoustic damper is defined by the converging-diverging section, the bridge, and the damper inlet feed. The acoustic damper dampens acoustic oscillations in the combustor. As a result, the unique liner structure can be used to form an integrated acoustic damper.

Figure 1:
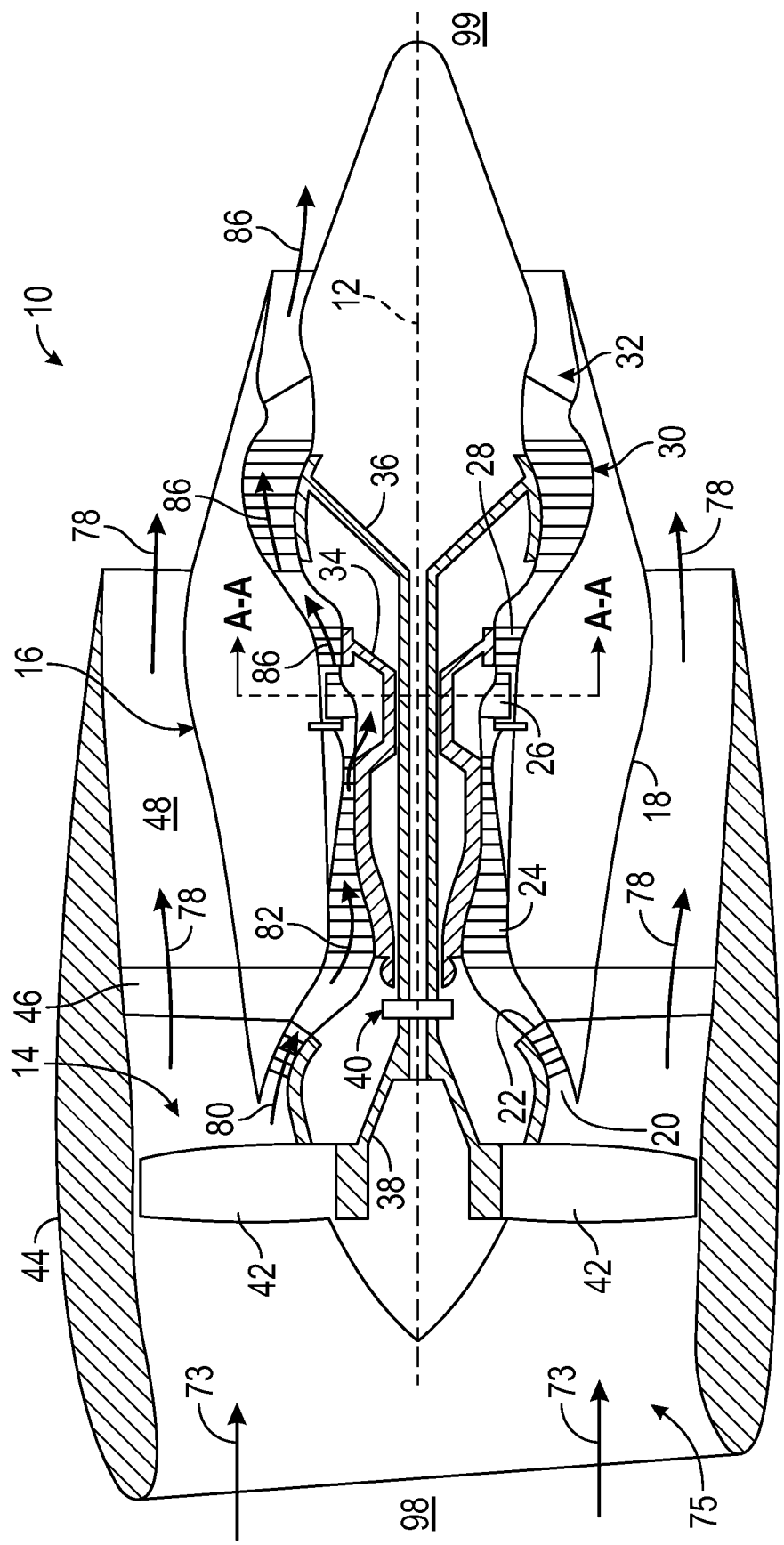
FIG. 1 is a schematic partially cross-sectional side view of an exemplary high by-pass turbofan jet engine, according to an embodiment of the present disclosure.

Referring now to the drawings, FIG. 1 is a schematic partially cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal or axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section, including a high pressure (HP) turbine 28, a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to the fan shaft 38 and extend radially outwardly from the fan shaft 38. An annular fan casing, or nacelle 44, circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16, so as to define a bypass airflow passage 48 therebetween.

Figure 2:
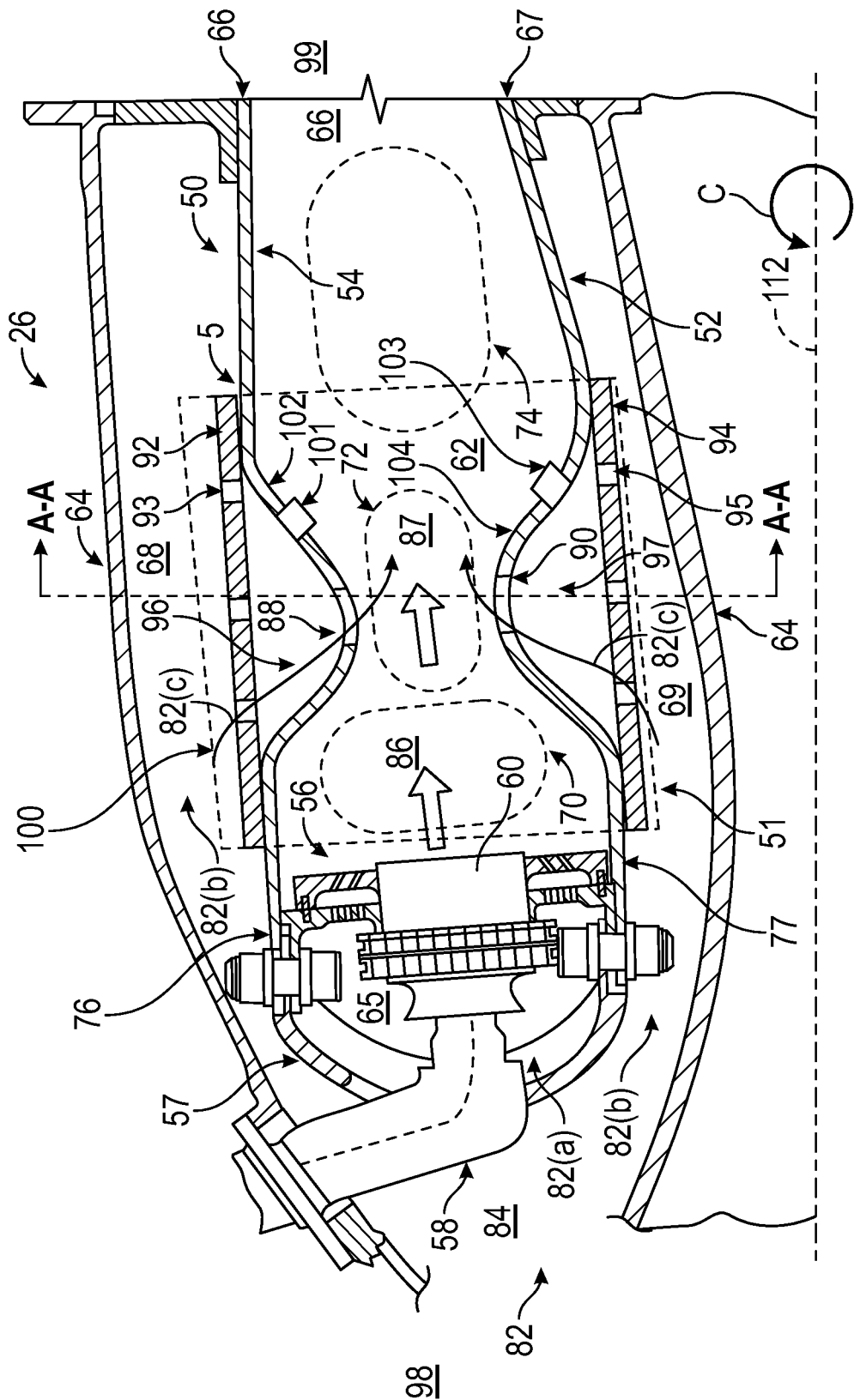
FIG. 2 is a cross-sectional side view of an exemplary combustion section, according to an embodiment of the present disclosure.

FIG. 2 is a cross-sectional side view of an exemplary combustion section 26 of the core engine 16 as shown in FIG. 1. As shown in FIG. 2, the combustion section 26 may generally include an annular type combustor assembly 50 having a combustor liner 51 that includes an inner liner 52 and an outer liner 54, and a dome assembly 56, together defining a combustion chamber 62. The combustion chamber 62 may more specifically define various regions, including a primary combustion zone 70, at which initial chemical reaction of a fuel-oxidizer mixture and/or recirculation of combustion gases 86 may occur before flowing further downstream to a dilution zone 72, where mixture and/or recirculation of combustion products and air may occur before flowing to a secondary combustion zone 74, where the combustion products flow into HP and LP turbines 28, 30. The dome assembly 56 extends radially between an upstream end 76 of the outer liner 54 and an upstream end 77 of the inner liner 52.

As shown in FIG. 2, the inner liner 52 and the outer liner 54 may be encased within an outer casing 64. A cowl 57 is connected at the upstream end 77 of the inner liner 52 and at the upstream end 76 of the outer liner 54. An outer flow passage 68 is defined between the outer casing 64 and the outer liner 54, and an inner flow passage 69 is defined between the outer casing 64 and the inner liner 52. The inner liner 52 may extend from the upstream end 77 at the dome assembly 56 to a downstream end 67 of the inner liner 52 at a turbine nozzle or inlet to the HP turbine 28 (FIG. 1). The outer liner 54 may extend from the upstream end 76 at the dome assembly 56 to a downstream end 66 of the outer liner 54 at the turbine nozzle. The outer liner 54 and the inner liner 52, therefore, at least partially define a hot gas path between the combustor assembly 50 and the HP turbine 28.

As further seen in FIG. 2, and as will be described in more detail below, the outer liner 54 includes an outer converging-diverging section 102, which may include a plurality of outer dilution openings 88, and at least one outer acoustic damper inlet feed member 101. The plurality of outer dilution openings 88 may be a plurality of outer dilution holes through the outer liner 54. Similarly, the inner liner 52 includes an inner converging-diverging section 104 that may include a plurality of inner dilution openings 90, and at least one inner acoustic damper inlet feed member 103. The plurality of inner dilution openings 90 may also be a plurality of inner dilution holes through the inner liner 52. As will be described in more detail below, the outer dilution openings 88 and the inner dilution openings 90 provide a flow of compressed air 82(c) therethrough into the combustion chamber 62. The flow of compressed air 82(c) can thus be utilized to provide quenching of the combustion gases 86 in the dilution zone 72 downstream of the primary combustion zone 70 so as to generate diluted combustion gases 87 that are cooled before entering the turbine section.

As further seen in FIG. 2, and as will be described in more detail below, an outer bridge member 92 provides a bridge across the outer converging-diverging section 102, and an inner bridge member 94 provides a bridge across the inner converging-diverging section 104. The outer bridge member 92 may include a plurality of outer bridge openings 93 therethrough, while the inner bridge member 94 may include a plurality of inner bridge openings 95 therethrough. An outer acoustic damper cavity 96 is defined between the outer bridge member 92 and the outer converging-diverging section 102, and an inner acoustic damper cavity 97 is defined between the inner bridge member 94 and the inner converging-diverging section 104. As will be discussed below with regard to FIG. 3, the outer acoustic damper cavity 96 defines a volume of an outer acoustic damper 143 (described below), and the inner acoustic damper cavity 97 defines a volume of an inner acoustic damper 145 (described below). The outer bridge openings 93 allow for a flow of the compressed air 82(c) to pass from the outer flow passage 68 through the outer bridge member 92 into the outer acoustic damper cavity 96, which then flows through the outer dilution openings 88 into the dilution zone 72 of the combustion chamber 62. Similarly, the inner bridge openings 95 allow for the flow of compressed air 82(c) to pass from the inner flow passage 69 into the inner acoustic damper cavity 97, which then flows through the inner dilution openings 90 into the dilution zone 72 of the combustion chamber 62.

During operation of the engine 10, as shown in FIGS. 1 and 2 collectively, a volume of air 73, as indicated schematically by arrows, enters the engine 10 from the upstream end 98 through an associated inlet 75 of the nacelle 44 and/or fan assembly 14. As the volume of air 73 passes across the fan blades 42, a portion of the air, as indicated schematically by arrows 78, is directed into the bypass airflow passage 48, or routed into the bypass airflow passage 48, while another portion of the air, as indicated schematically by an arrow 80, is directed into the LP compressor 22, or routed into the LP compressor 22. Air portion 80 is progressively compressed as it flows through the LP and HP compressors 22, 24 towards the combustion section 26. As shown in FIG. 2, the now compressed air, as indicated schematically by arrow 82, flows across a compressor exit guide vane (CEGV) (not shown) and through a pre-diffuser (not shown) into a diffuser cavity 84 of the combustion section 26.

The compressed air 82 pressurizes the diffuser cavity 84. A first portion of the compressed air 82, as indicated schematically by arrows 82(a), flows from the diffuser cavity 84 through an opening of the cowl 57 and into a pressure plenum 65, where it is then swirled by, and mixed with fuel provided by a fuel nozzle assembly 58 and a fuel-air mixer assembly 60, to generate a swirled fuel-air mixture that is then ignited and burned to generate the combustion gases 86 within the primary combustion zone 70 of the combustion chamber 62. Typically, the LP and HP compressors 22, 24 provide more compressed air to the diffuser cavity 84 than is needed for combustion. Therefore, a second portion of the compressed air 82, as indicated schematically by arrows 82(b), may be used for various purposes other than combustion. For example, as shown in FIG. 2, compressed air 82(b) may be routed into the outer flow passage 68 and into the inner flow passage 69. A portion of the compressed air 82(b) may then be routed through the outer bridge openings 93 into outer acoustic damper cavity 96, and through outer dilution openings 88 (schematically shown as compressed air 82(c)) and into the dilution zone 72 of combustion chamber 62 to provide quenching of the combustion gases 86 in the dilution zone 72 so as to generate diluted combustion gases 87. The compressed air 82(c) flowing into the dilution zone 72 may also provide turbulence to the flow of combustion gases 86 so as to provide better mixing of the dilution oxidizer gas (e.g., compressed air 82(c)) with the combustion gases 86. A similar flow of the compressed air 82(c) from the inner flow passage 69 flows through the inner bridge openings 95 into inner acoustic damper cavity 97, and through the inner dilution openings 90 into the dilution zone 72 of the combustion chamber 62. In addition, or in the alternative, at least a portion of compressed air 82(b) may be routed out of the diffuser cavity 84. For example, a portion of compressed air 82(b) may be directed through various flow passages to provide cooling air to at least one of the HP turbine 28 or the LP turbine 30.

Referring still to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are also routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive at the downstream end 99.

As will be described in more detail below, the combustor liner 51 includes a combustor liner converging-diverging portion 100. The combustor liner converging-diverging portion 100 includes the outer converging-diverging section 102 in the dilution zone 72 of the combustion chamber 62, and the inner converging-diverging section 104 in the dilution zone 72 of the combustion chamber 62. One purpose of the combustor liner converging-diverging portion 100 is to provide for better quenching of the combustion gases 86 deeper within the dilution zone 72 of the combustion chamber 62 so as to reduce NOx emissions. In addition, as will be described below with regard to FIG. 3, the outer converging-diverging section 102 forms a part of the outer acoustic damper 143, and the inner converging-diverging section 104 forms a part of the inner acoustic damper 145. The outer acoustic damper 143 and the inner acoustic damper 145 are generally arranged as Helmholtz acoustic dampers so as to dampen acoustic characteristics of the combustor 50.

Figure 3:
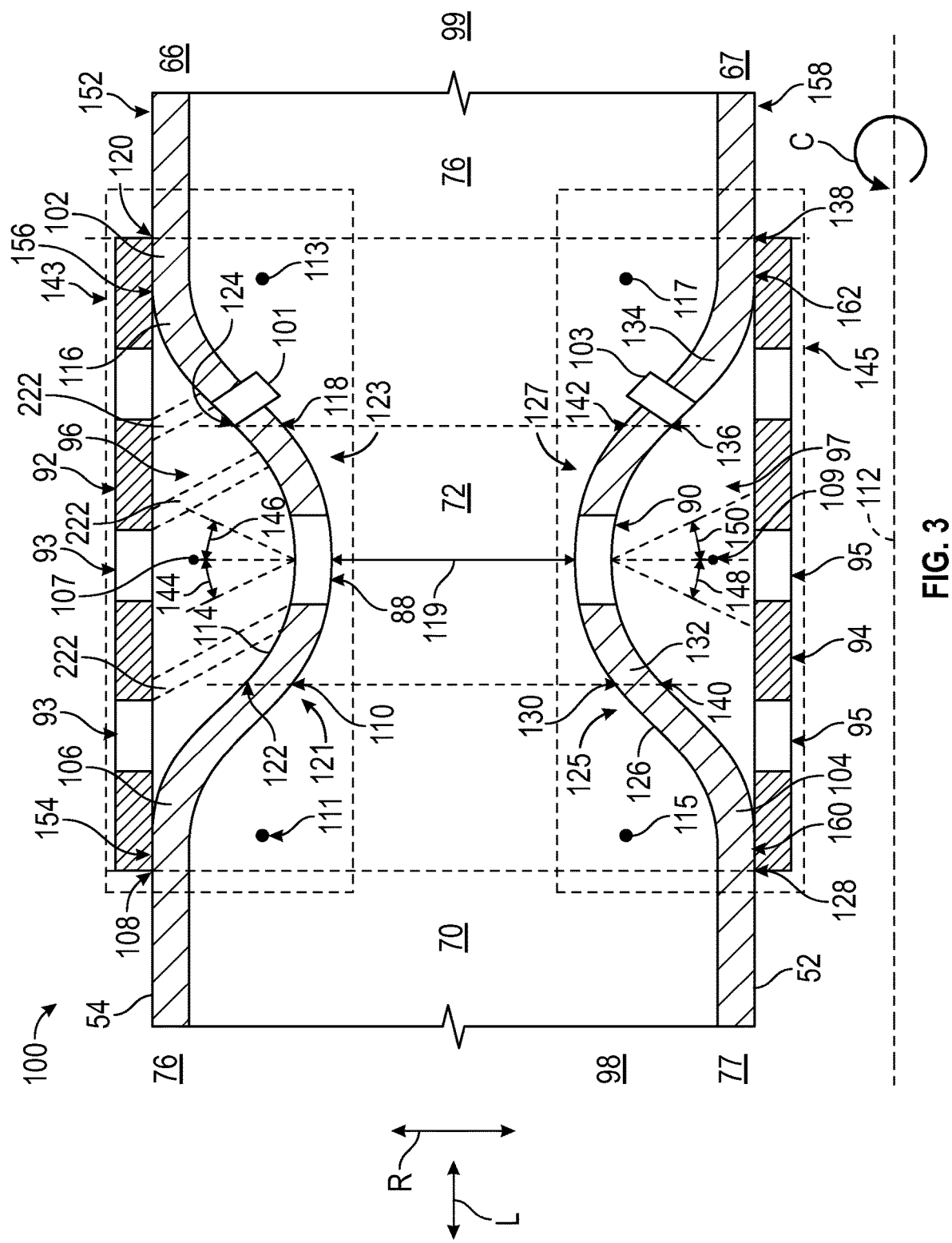
FIG. 3 depicts a partial cross-sectional side view of an exemplary converging-diverging portion of a combustor liner including acoustic dampers, according to an aspect of the present disclosure.

FIG. 3 is a partial cross-sectional side view of the combustor liner converging-diverging portion 100 having acoustic dampers, according to an aspect of the present disclosure. The combustor liner converging-diverging portion 100 includes the outer converging-diverging section 102, and the inner converging-diverging section 104, each of which will be described in more detail below. Both the outer converging-diverging section 102 and the inner converging-diverging section 104 extend circumferentially about a combustor centerline 112 of the combustor, and also extend in the longitudinal direction L, with respect to the combustor centerline 112. Here, the combustor centerline 112 may be the same as the engine centerline 12. The dilution zone 72 is defined between the outer converging-diverging section 102 and the inner converging-diverging section 104.

The outer converging-diverging section 102 (hereafter referred to as an "OCD section") in FIG. 3 can be seen to extend from an upstream end 108 of the OCD section 102 to a downstream end 120 of the OCD section 102. The OCD section 102 also extends radially inward and downstream along the longitudinal direction with respect to the combustor centerline 112, and then extends radially outward and downstream along the longitudinal direction with respect to the combustor centerline 112. Similarly, the inner converging-diverging section 104 (hereafter referred to as an "ICD section) generally extends from an upstream end 128 of the ICD section 104 to a downstream end 138 of the ICD section 104. The ICD section 104 also extends radially outward and downstream along the longitudinal direction with respect to the combustor centerline 112, and then extends radially inward and downstream along the longitudinal direction with respect to the combustor centerline 112. Particular portions of the outer liner 54 and the inner liner 52 that may form the OCD section 102 and the ICD section 104 will be described in more detail below. Both the OCD section 102 and the ICD section 104 extend into the dilution zone 72 of the combustion chamber 62, and are generally radially opposed to one another across the combustion chamber 62.

The OCD section 102 includes at least one outer dilution opening 88 defined through the OCD section 102 for providing a flow of an oxidizer (i.e., the compressed air 82(c)) through the OCD section 102 to the dilution zone 72 of the combustion chamber 62. Similarly, the ICD section 104 includes at least one inner dilution opening 90 defined through the ICD section 104 for providing a flow of the oxidizer (i.e., the compressed air 82(c)) through the ICD section 104 to the dilution zone 72 of the combustion chamber 62.

Referring still to FIG. 3, the OCD section 102 can generally be seen to be formed continuously as part of the outer liner 54, and may be considered to include three general parts: a converging portion, a diverging portion, and a transition portion. More specifically, the OCD section 102 includes an OCD section converging portion 106 that converges radially inward and longitudinally downstream, with respect to the combustor centerline 112, into the combustion chamber 62 from the upstream end 108 of the OCD section 102 to an upstream end 110 of an OCD section transition portion 114. The OCD section converging portion 106 may take the shape of a semi-circle with a center 111 thereof being located within the combustion chamber 62. Alternatively, the OCD section converging portion 106 may have a parabolic shape or a straight line shape. The OCD section 102 further includes an OCD section diverging portion 116 that extends radially outward and longitudinally downstream, with respect to the combustor centerline 112, from a downstream end 118 of the OCD section transition portion 114 to the downstream end 120 of the OCD section 102. The OCD section diverging portion 116 may also have a semi-circular shape with a center 113 thereof being located within the combustion chamber 62. Alternatively, the OCD section diverging portion 116 may have a parabolic shape or a straight line shape. The OCD section transition portion 114 connects a downstream end 122 of the OCD section converging portion 106 and an upstream end 124 of the OCD section diverging portion 116. The OCD section transition portion 114 may have a parabolic shape with a focus 107 thereof being located on a radially outward side of the OCD section transition portion 114, with respect to the combustor centerline 112. The parabolic shape of the OCD section transition portion 114 may have a width to depth ratio of 1:4. Alternatively, the OCD section transition portion 114 may have a semi-circular shape or a straight line shape. Thus, an upstream portion 121 of the OCD section 102, defined by the OCD section converging portion 106 and at least a portion of the OCD section transition portion 114, extends radially inward and downstream along the longitudinal direction with respect to the combustor centerline 112, and a downstream portion 123 of the OCD section 102, defined by at least a portion of the OCD section transition portion 114 and the OCD section diverging portion 116, extends radially outward and downstream along the longitudinal direction with respect to the combustor centerline 112.

In FIG. 3, the outer bridge member 92 is seen to be connected to the outer liner 54. In the aspect of present disclosure shown in FIG. 3, the outer bridge member 92 is connected to a radially outer surface 152 of the outer liner 54, and is disposed so as to bridge across the OCD section 102. The outer bridge member 92 may be brazed or welded to the radially outer surface 152 at an outer liner-bridge upstream welded joint 154 and at an outer liner-bridge downstream welded joint 156. Alternatively, instead of being brazed or welded to the radially outer surface 152, the outer bridge may instead be attached to the OCD section 102 via a plurality of outer bridge support members 222. The outer bridge support members 222 may be brazed or welded to the outer bridge member 92 and may also be brazed or welded to the OCD section 102, leaving both upstream and downstream ends of the outer bridge member 92 free floating along the radially outer surface 152. As was discussed above, the outer bridge member 92 includes a plurality of outer bridge openings 93 through the outer bridge member 92. The outer bridge openings 93 are arranged to provide a flow of the compressed air 82(c) from the outer flow passage 68 to the outer acoustic damper cavity 96 formed within the OCD section 102.

The ICD section 104 is similar to, and more or less a mirror image of, the OCD section 102, and as shown in the FIG. 3 aspect, may be continuously formed as part of the inner liner 52. Thus, the ICD section 104 includes an ICD section converging portion 126 that converges radially outward and longitudinally downstream, with respect to the combustor centerline 112, into the combustion chamber 62 from an upstream end 128 of the ICD section 104 to an upstream end 130 of an ICD section transition portion 132. The ICD section converging portion 126 may have a semicircular shape with a center 115 thereof being located within the combustion chamber 62. Alternatively, the ICD section converging portion 126 may have a parabolic shape or a straight line shape. The ICD section 104 includes an ICD section diverging portion 134 that extends radially inward and longitudinally downstream, with respect to the combustor centerline 112, from a downstream end 136 of the ICD section transition portion 132 to the downstream end 138 of the ICD section 104. The ICD section diverging portion 134 may have a semi-circular shape with a center 117 thereof being located within the combustion chamber 62. Alternatively, the ICD section diverging portion 134 may have a parabolic shape or a straight line shape. The ICD section transition portion 132 connects a downstream end 140 of the ICD section converging portion 126 and an upstream end 142 of the ICD section diverging portion 134. The ICD section transition portion 132 may have a parabolic shape with a focus 109 thereof being located on a radially inward side of the ICD section transition portion 132, with respect to the combustor centerline 112. The parabolic shape of the ICD section transition portion 132 may have a width to depth ratio of 1:4. Alternatively, the ICD section transition portion 132 may have a semi-circular shape or a straight line shape. Thus, an upstream portion 125 of the ICD section 104, defined by the ICD section converging portion 126 and at least a portion of the ICD section transition portion 132, extends radially outward and downstream along the longitudinal direction with respect to the combustor centerline 112, and a downstream portion 127 of the ICD section 104, defined by at least a portion of the ICD section transition portion 132 and the ICD section diverging portion 134, extends radially inward and downstream along the longitudinal direction with respect to the combustor centerline 112.

In FIG. 3, the inner bridge member 94 is similar to outer bridge member 92 and is seen to be connected to the inner liner 52. In the aspect of present disclosure shown in FIG. 3, the inner bridge member 94 is connected to a radially inner surface 158 of the inner liner 52, and is disposed so as to bridge across the ICD section 104. The inner bridge member 94 may be brazed or welded to the radially inner surface 158 of the inner liner 52 at an inner liner-bridge upstream welded joint 160 and at an inner liner-bridge downstream welded joint 162. Similar to the OCD section 102, the inner bridge member 94 may be connected to the ICD section 104 via a plurality of inner bridge support members (not shown), which may be the same as the outer bridge support members 222. As was discussed above, the inner bridge member 94 includes a plurality of inner bridge openings 95 through the inner bridge member 94. The inner bridge openings 95 are arranged to provide a flow of the compressed air 82(c) from the inner flow passage 69 to the inner acoustic damper cavity 97 formed within the ICD section 104.

As can be seen in FIGS. 2 and 3, both the OCD section 102 and the ICD section 104 have a generally smooth transitioned sine wave type shape to provide for an aerodynamic flow of the combustion gases 86 within the combustion chamber 62. However, either or both of the OCD section 102 and the ICD section 104 may be formed with a trapezoidal-type structure having straight line segments instead of having a smooth curved sine wave type shape. The OCD section transition portion 114 and the ICD section transition portion 132 form a throat 119 between them, and the outer dilution openings 88 and the inner dilution openings 90 are provided through the transition portions so as to provide a dilution airflow in the throat 119.

Referring still to FIG. 3, the outer dilution opening 88 is shown to be defined through the OCD section transition portion 114, and the dilution opening 90 is shown to be defined through the ICD section transition portion 132. However, the dilution openings may be implemented in other portions of the OCD section 102 and the ICD section 104. In addition, although not shown in FIG. 3, but as described below with regard to FIG. 5, the OCD section 102 may include a plurality of cooling holes 210 through, for example, the OCD section converging portion 106. The cooling holes 210 may generally have a smaller size than the outer dilution opening 88 and provide surface cooling air from the outer acoustic damper cavity 96 to an inner surface of the OCD section 102 within the combustion chamber 62. In addition, while the cross-sectional view of FIG. 3 depicts a single outer dilution opening 88 through the OCD section transition portion 114, it can readily be understood that a plurality of the outer dilution openings 88 may be included. For example, multiple outer dilution openings 88 may be circumferentially spaced around the outer liner 54. Similarly, multiple inner dilution openings 90 may be circumferentially spaced around the inner liner 52. In addition, while the outer dilution opening 88 and the inner dilution opening 90 are shown to be directly opposed to one another across the combustion chamber 62, they could be circumferentially or longitudinally offset from one another.

In FIG. 3, the outer dilution opening 88 and the inner dilution opening 90 are generally shown as being a circular hole or a cylindrical hole that is generally perpendicular to the combustor centerline 112. Other shapes such as square, elliptic, race-track, triangular, etc., however, may be implemented for the outer dilution opening 88 and the inner dilution opening 90. Further, while the outer dilution opening 88 and the inner dilution opening 90 are shown to be arranged generally perpendicular to the combustor centerline 112, they may be angled instead. For example, the outer dilution opening 88 may be arranged at a radial angle 144 or a radial angle 146, where the radial angle 144 may range from zero to minus thirty degrees and the radial angle 146 may range from zero to plus thirty degrees. Similarly, the inner dilution opening 90 may be angled at a radial angle 148 or at a radial angle 150, where the radial angle 148 may range from zero to plus thirty degrees and the radial angle 150 may range from zero to minus thirty degrees. Of course, the foregoing ranges are merely exemplary and other angle ranges may be implemented instead to obtain a desired dilution flow of the air through the dilution opening.

Referring still to FIG. 3, the OCD section 102 is seen to include the outer acoustic damper inlet feed member 101. The outer acoustic damper inlet feed member 101 is seen to be disposed downstream of the throat 119, and, in particular, is disposed through the OCD section diverging portion 116. Similarly, the ICD section 104 is seen to include the inner acoustic damper inlet feed member 103 disposed downstream of the throat 119 and is disposed through the ICD section diverging portion 134. The outer acoustic damper 143 is defined, at least in part, by the outer bridge member 92 and the OCD section 102, which form the outer acoustic damper cavity 96 therebetween having the outer dilution opening 88, and the outer acoustic damper inlet feed member 101. The inner acoustic damper 145 is defined, at least in part, by the inner bridge member 94 and the ICD section 104, which form the inner acoustic damper cavity 97 therebetween having the inner dilution opening 90, and the inner acoustic damper inlet feed member 103. A general description of a Helmholtz acoustic damper will now be provided, as it may be applicable to both the outer acoustic damper 143 and the inner acoustic damper 145.

Figure 4:
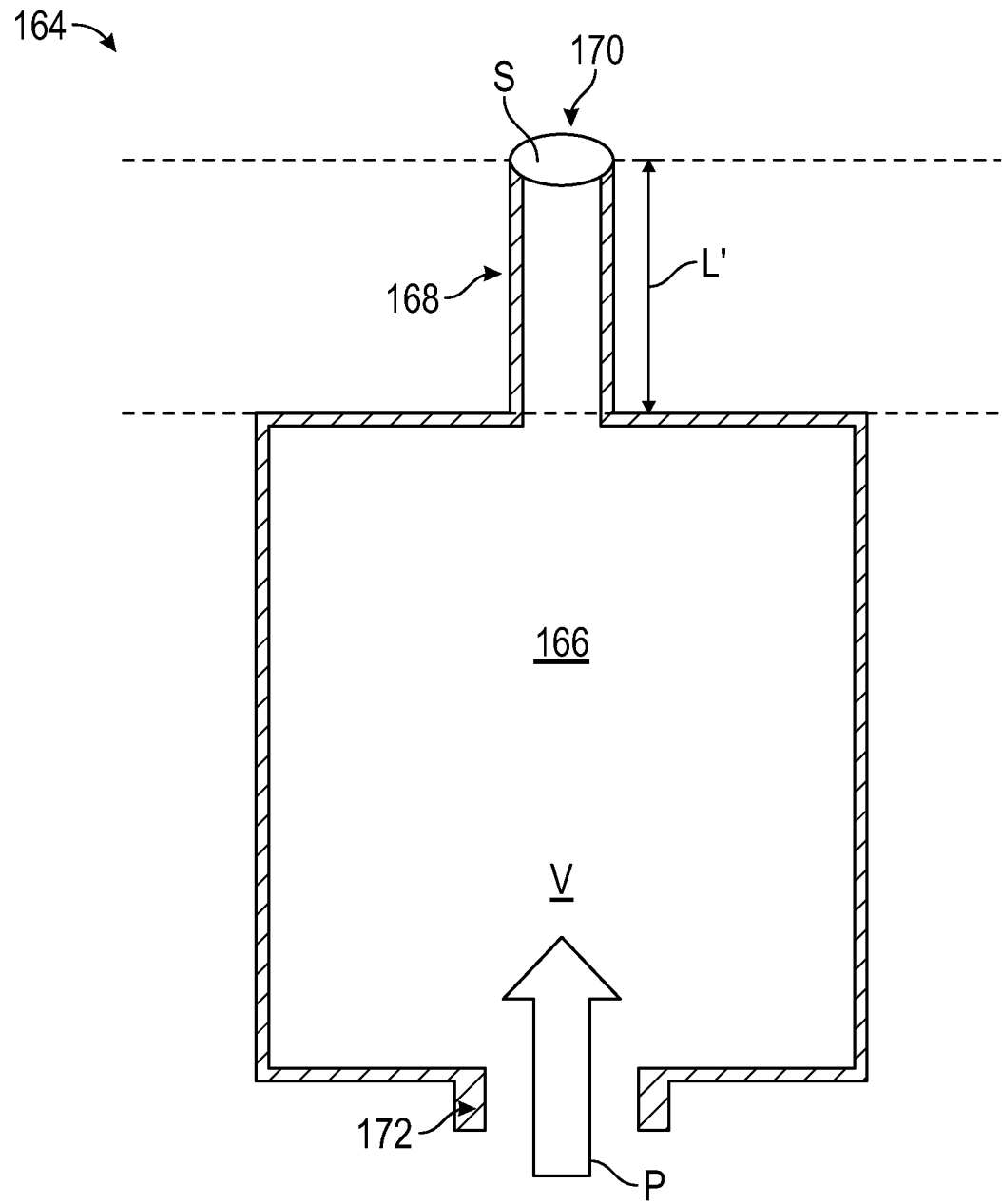
FIG. 4 depicts an exemplary cross section of a Helmholtz resonating damper, according to an aspect of the present disclosure.

FIG. 4 depicts a schematic of an example of component parts that generally form a Helmholtz acoustic damper 164. The FIG. 4 schematic is merely a general representation of a Helmholtz acoustic damper, and is not intended to be an exact representation of an acoustic damper implemented in the combustor of the present disclosure. Rather, a description will be provided below as to how various elements of the disclosed combustor may be applied to the general schematic of FIG. 4. In FIG. 4, the Helmholtz acoustic damper 164 may include a cavity 166 having a volume V. The Helmholtz acoustic damper 164 may include an opening 172 that may allow air P to flow into the cavity 166. The Helmholtz acoustic damper 164 may include a neck 168 between the cavity 166 and a neck inlet orifice 170. The neck inlet orifice 170 may have a cross-sectional area S and the neck 168 may have a length L'. A frequency at which the Helmholtz acoustic damper 164 may dampen may be calculated with Equation 1 below, where c is the speed of sound, S is the cross-sectional area of the neck inlet orifice 170, V is the volume of the cavity 166, and L' is the length of the neck 168. In examples where multiple neck inlet orifices 170 are included, the area S may be the sum of all of the cross-sectional areas of the neck inlet orifices 170.

$$f = \frac{c}{2\pi}\sqrt{\sqrt{\frac{S}{V*L'}}} \qquad \text{Equation 1}$$

As the foregoing description of FIG. 4 may apply to the present disclosure, for the outer acoustic damper 143, the outer acoustic damper 143 may correspond to the Helmholtz acoustic damper 164, the outer acoustic damper inlet feed member 101 may correspond to the neck 168 having the length L' and the cross-sectional area S of the neck inlet orifice 170, the outer acoustic damper cavity 96 may correspond to the cavity 166 having a volume V, and the opening 172 may correspond to the outer bridge openings 93. Thus, the outer acoustic damper neck may be referred to as 168(*o*), and the outer acoustic damper neck inlet orifice may be referred to as 170(*o*), while the inner acoustic damper neck may be referred to as 168(*i*) and the inner acoustic damper inlet orifice may referred to as 170(*i*). The outer acoustic damper inlet feed member 101 (i.e., the outer neck 168(*o*) and length L' and cross-sectional area S of the outer orifice 170(*o*)) may be configured so as to have a frequency (f) in a range from two-hundred hertz to eight hundred-hertz, or in a range from eight-hundred hertz to sixteen-hundred hertz. The same applies to the frequency tuning of the inner acoustic damper 145, such that the various elements (e.g., the inner neck 168(*i*) and the inner inlet orifice 170(*i*)) of the inner acoustic damper inlet feed member 103 may be sized so that the inner acoustic damper has a frequency in a range from two-hundred hertz to eight-hundred hertz, or a range of eight-hundred hertz to sixteen-hundred hertz. In addition, the outer acoustic damper 143 and the inner acoustic damper 145 may be configured to dampen different frequency ranges. For example, the outer acoustic damper may be configured to have a frequency in a range from two-hundred hertz to eight-hundred hertz, and the inner acoustic damper may be configured to have a frequency in a range from eight-hundred hertz to sixteen-hundred hertz. With this arrangement, the dampers can be individually configured to dampen different frequencies within the combustor so as to provide even better dampening of the combustor acoustic characteristics.

Figure 5:
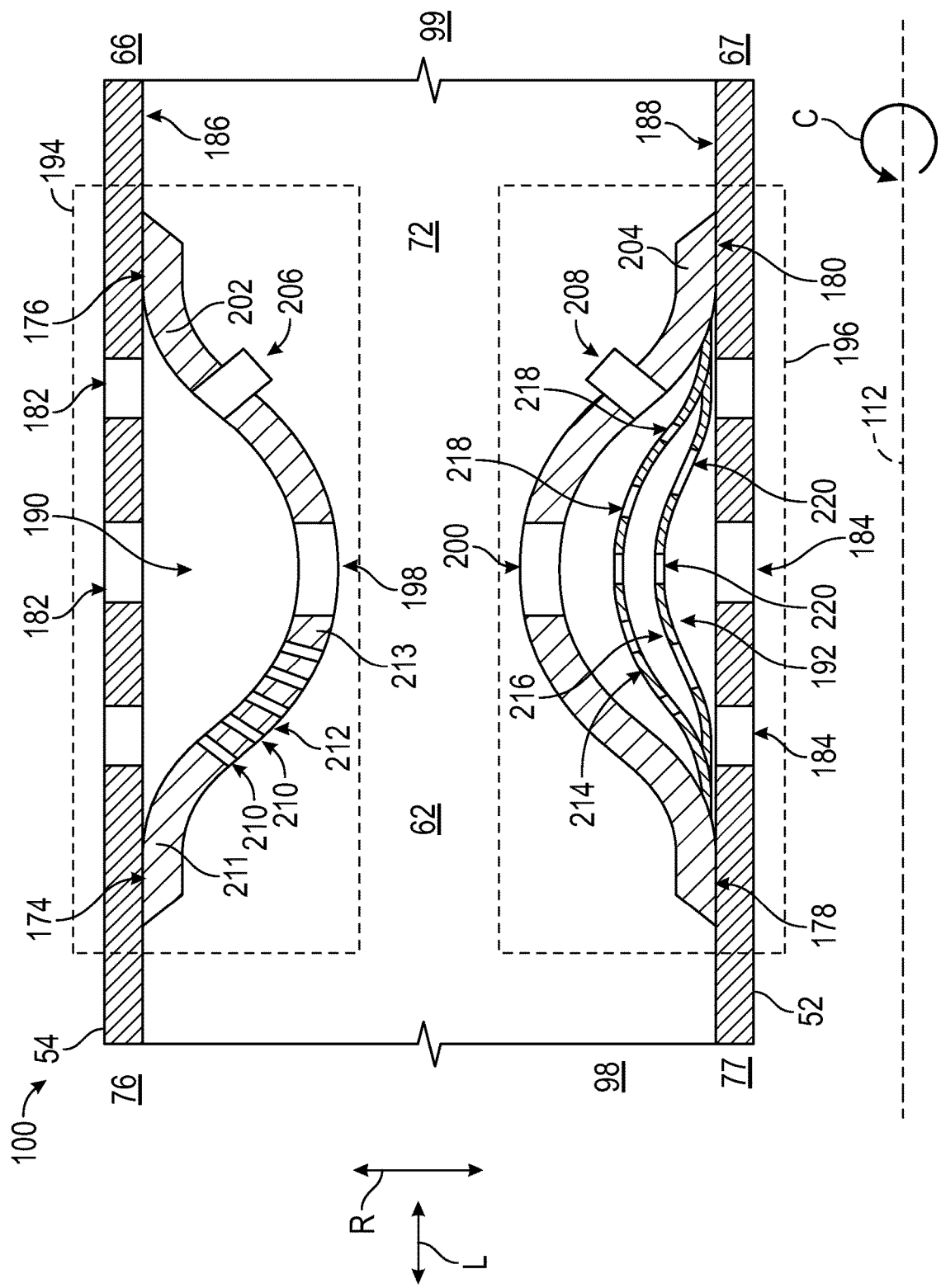
FIG. 5 depicts a partial cross-sectional side view of an exemplary converging-diverging portion of a combustor liner including acoustic dampers, according to another aspect of the present disclosure.

FIG. 5 is a partial cross-sectional side view of the combustor liner converging-diverging portion 100 having acoustic dampers, according to another aspect of the present disclosure. In the FIG. 5 aspect, the combustor liner converging-diverging portion 100 includes an outer acoustic damper 194 and an inner acoustic damper 196, similar to the outer acoustic damper 143 and the inner acoustic damper 145 of FIG. 3. In FIG. 5, however, the OCD section 102 is not continuously formed in the outer liner 54, but rather, is a separate OCD section 202 that is connected to the outer liner 54 on a radially inner surface 186 of the outer liner 54 (i.e., on the surface of the outer liner 54 adjacent to the combustion chamber 62). The outer liner 54 is comprised of a continuously straight (or slightly curved) outer liner along the longitudinal direction, and the separate OCD section 202 may be brazed or welded to the outer liner 54. For instance, the separate OCD section 202 may be brazed or welded to the radially inner surface 186 of the outer liner 54 at an OCD section upstream welded joint 174 and at an OCD section downstream welded joint 176. Thus, with the OCD section 202 being connected to the outer liner 54, an outer damper cavity 190 is formed therebetween. The outer damper cavity 190 may be similar to the outer acoustic damper cavity 96 of FIG. 3.

Also, similar to the arrangement shown in FIG. 3, the outer liner 54 may include outer liner openings 182, that are similar to the outer bridge openings 93, that allow for the flow of the compressed air 82(c) to pass from the outer flow passage 68 through the outer liner 54 into the outer damper cavity 190. The OCD section 202 includes outer dilution openings 198, which may be similar to the outer dilution openings 88 of FIG. 3, to allow the compressed air 82(c) to then flow from the outer damper cavity 190 into the dilution zone 72 of the combustion chamber 62. In addition, the OCD section 202 includes an outer acoustic damper inlet feed member 206, which may be similar to the outer acoustic damper inlet feed member 101 described with regard to FIG. 3. Thus, the outer liner 54 having the outer liner openings 182, the OCD section 202 joined to the outer liner 54, and the outer acoustic damper inlet feed member 206 form an outer acoustic damper 194, which may be similar to the outer acoustic damper 143. The outer acoustic damper 194 may be tuned similar to the outer acoustic damper 143, as was described above.

Similarly, in FIG. 5, the ICD section 104 is not continuously formed in the inner liner 52, but rather, is a separate ICD section 204 that is connected to the inner liner 52 on a radially outer surface 188 of the inner liner 52 (i.e., on the surface of the inner liner 52 adjacent to the combustion chamber 62). The inner liner 52 is comprised of a continuously straight (or slightly curved) inner liner along the longitudinal direction, and the separate ICD section 204 may be brazed or welded to the inner liner 52. For instance, the separate ICD section 204 may be brazed or welded to the radially outer surface 188 of the inner liner 52 at an ICD section upstream welded joint 178 and at an ICD section downstream welded joint 180. Thus, with the ICD section 204 being connected to the inner liner 52, an inner damper cavity 192 is formed therebetween. The inner damper cavity 192 may be similar to the inner acoustic damper cavity 97 of FIG. 3.

Also, similar to the arrangement shown in FIG. 3, the inner liner 52 may include inner liner openings 184, that are similar to the inner bridge openings 95, that allow for the flow of the compressed air 82(c) to pass from the inner flow passage 69 through the inner liner 52 into the inner damper cavity 192. The ICD section 204 includes a plurality of inner dilution openings 200, which may be similar to the inner dilution openings 90 of FIG. 3, to allow the compressed air 82(c) to then flow from the inner damper cavity 192 into the dilution zone 72 of the combustion chamber 62. In addition, the ICD section 204 includes an inner acoustic damper inlet feed member 208, which may be similar to the inner acoustic damper inlet feed member 103 described with regard to FIG. 3. Thus, the inner liner 52 having the inner liner openings 184, the ICD section 204 joined to the inner liner 52, and the inner acoustic damper inlet feed member 208 form the inner acoustic damper 196, which may be similar to the inner acoustic damper 145. The inner acoustic damper 196 may be tuned similar to the inner acoustic damper 145, as was described above.

Referring still to FIG. 5, the OCD section 202 depicted therein is shown to further include the plurality of cooling holes 210 through the OCD section 202. The cooling holes 210 may be smaller in size than the outer dilution opening 198 and are arranged to provide a flow of the compressed air 82(c) from the outer damper cavity 190 through the OCD section 202 so as to provide surface cooling to a radially inner surface 212 of the OCD section 202. The cooling holes 210 may be arranged through an OCD section converging portion 211, corresponding to the OCD section converging portion 106 of FIG. 3, and/or through an OCD section transition portion 213, corresponding to the OCD section transition portion 114 of FIG. 3. While not depicted in FIG. 5, corresponding cooling holes 210 may also be arranged through the ICD section 204, in essentially a mirror image arrangement. In addition, while not depicted in FIG. 3, the cooling holes 210 may also be arranged through the OCD section 102 and the ICD section 104 of FIG. 3 in a similar manner as the cooling holes 210 shown in FIG. 5.

In FIG. 5, the inner acoustic damper 196 is further shown to include a plurality of damper cavity shields within the inner damper cavity 192, including a damper cavity shield 214 and a damper cavity shield 216. The damper cavity shield 214 is seen to include a plurality of damper cavity shield openings 218 therethrough, and the damper cavity shield 216 is seen to include a plurality of damper cavity shield openings 220 therethrough. The plurality of damper cavity shield openings 218 and the plurality of damper cavity shield openings 220 provide for a flow of the air within the inner damper cavity 192 to flow therethrough and to the inner dilution opening 200. The damper cavity shield 216 and the damper cavity shield 214 provide a multi-layer arrangement of a Helmholtz resonator that can be used to dampen a wider range of frequencies. Each of the damper cavity shield 216 and the damper cavity shield 214 may, like the ICD section 204, be brazed or welded to the inner liner 52 at the ICD section upstream welded joint 178 and at the ICD section downstream welded joint 180. While not depicted in FIG. 5, a corresponding damper cavity shield 216 and a corresponding damper cavity shield 214 may also be arranged within the outer damper cavity 190 of the OCD section 202, in essentially a mirror image arrangement. In addition, while not depicted in FIG. 3, damper cavity shields may be implemented within the outer acoustic damper cavity 96 and/or within the inner acoustic damper cavity 97 in a similar manner as the damper cavity shields shown in FIG. 5.

Figure 6:
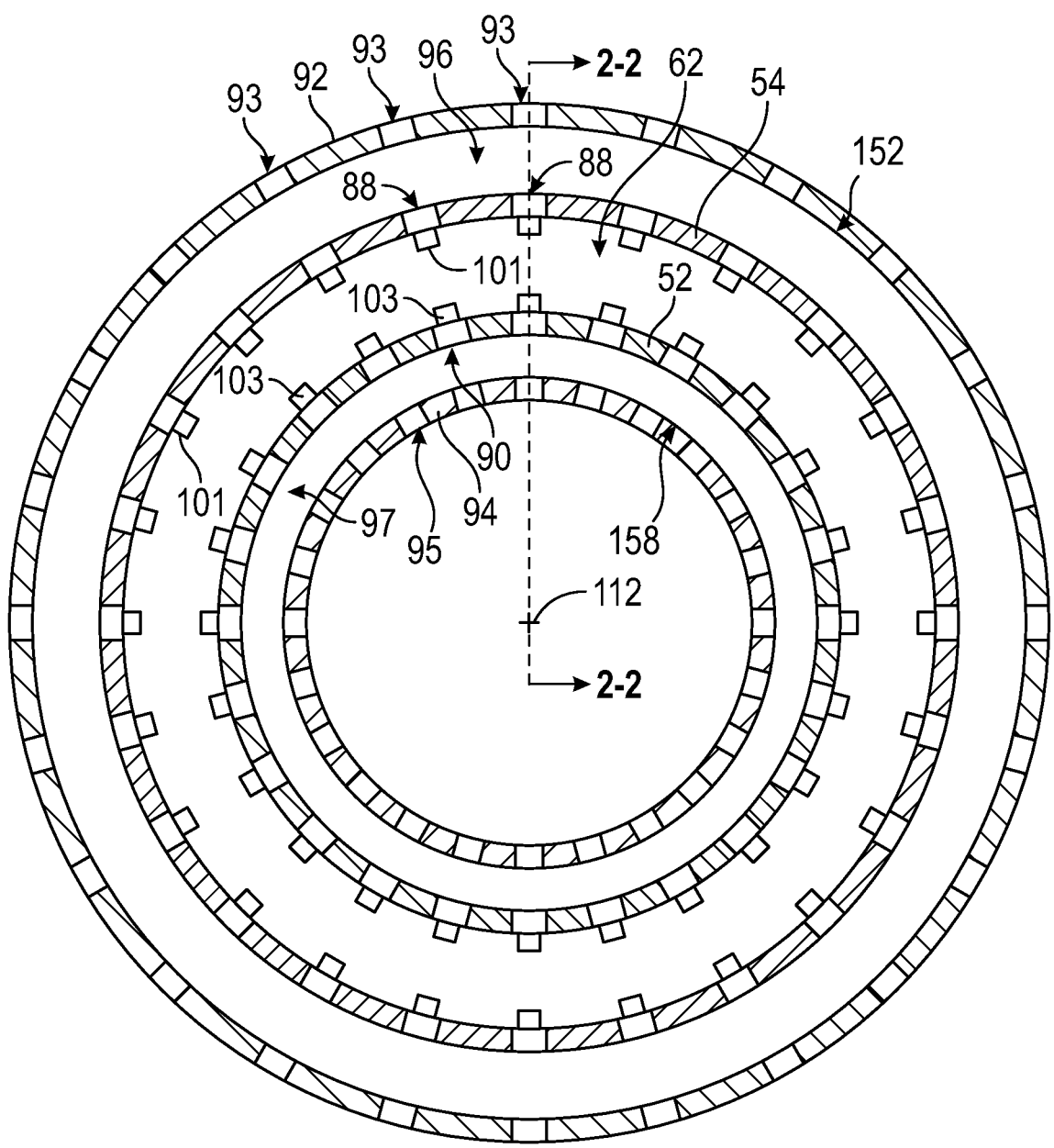
FIG. 6 depicts a partial cross-sectional aft-looking view of an annular combustor taken at plane A-A of FIGS. 1 and 2, according to an aspect of the present disclosure.
Figure 7:
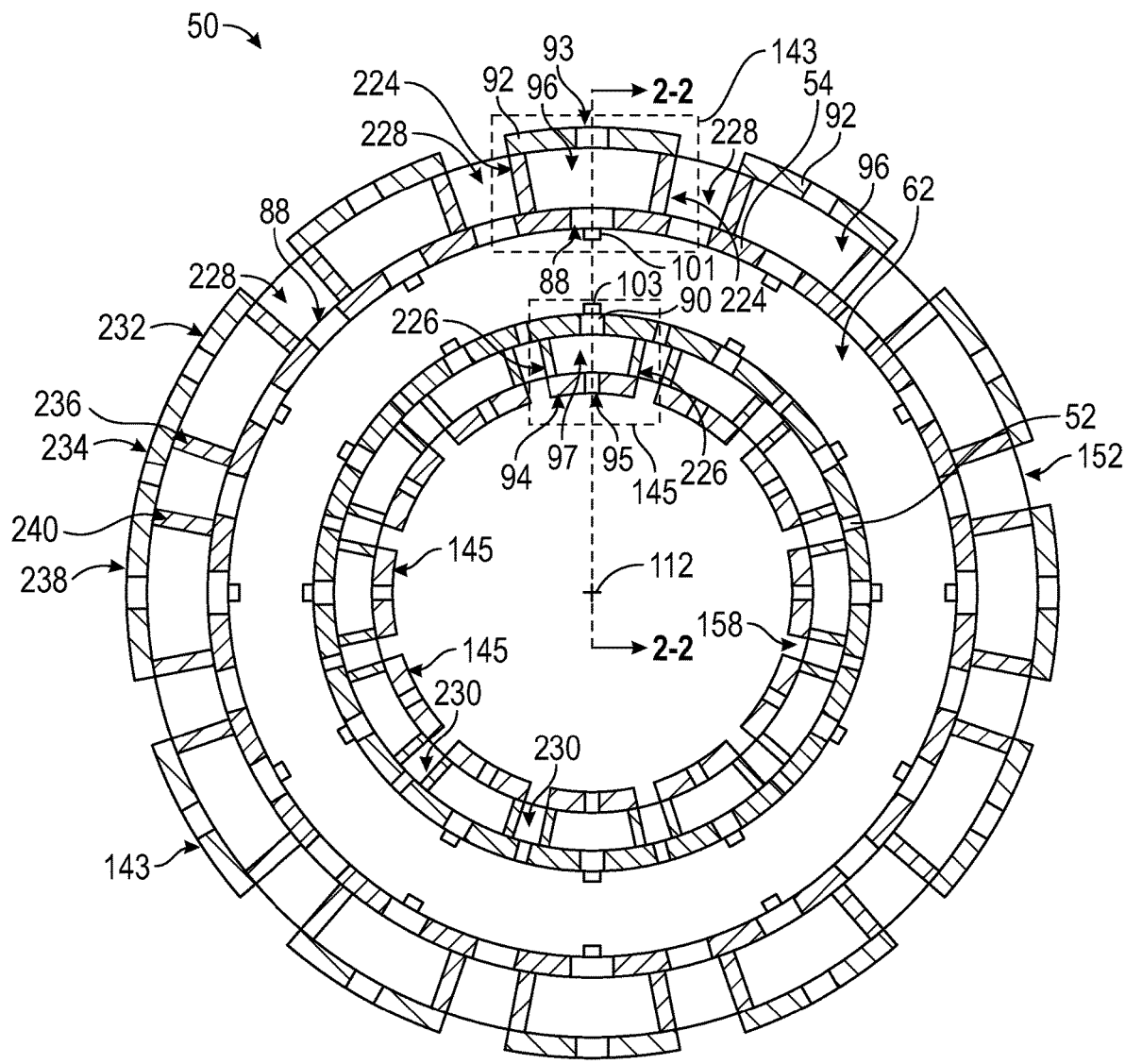
FIG. 7 depicts a partial cross-sectional aft-looking view of an annular combustor taken at plane A-A of FIGS. 1 and 2, according to an aspect of the present disclosure.

Referring to FIGS. 6 and 7, depicted therein are partial cross-sectional views of examples of an annular combustor 50 taken at plane A-A of FIG. 1. In FIGS. 6 and 7, the partial cross-sectional view of the combustor 50 in FIG. 2 can be seen to be taken at plane 2-2. In FIGS. 6 and 7, the annular combustor 50 is seen to include the outer liner 54, which is an annular outer liner 54 that extends circumferentially about the combustor centerline 112. In addition, the annular combustor 50 includes the inner liner 52, which is an annular inner liner 52 that extends circumferentially about the combustor centerline 112. In FIG. 6, the outer bridge member 92 is seen to be an annular outer bridge member 92 that extends circumferentially about the combustor centerline 112, along the radially outer surface 152 of the annular outer liner 54. Thus, the outer damper cavity 96 is seen to be an annular outer damper cavity 96 that extends circumferentially about the combustor centerline 112. Similarly, the inner bridge member 94 is seen to be an annular inner bridge member 94 that extends circumferentially about the combustor centerline 112, along the radially inner surface 158 of the annular inner liner 52. Thus, the inner acoustic damper cavity 97 is seen to be an annular inner damper cavity that extends circumferentially about the combustor centerline 112.

The annular outer bridge member 92 of FIG. 6 includes the outer bridge member openings 93, and as can be seen in FIG. 6, a plurality of the outer bridge member openings 93 may be circumferentially spaced about the combustor centerline 112 through the annular outer bridge member 92. The annular outer liner 54 is also seen to include a plurality of the outer dilution openings 88 that are circumferentially spaced about the combustor centerline 112 through the annular outer liner 54. In addition, the annular outer liner 54 is seen to include a plurality of the outer acoustic damper inlet feed members 101 circumferentially spaced about the combustor centerline 112. Thus, in FIG. 6, the outer acoustic damper 143 is arranged as an annular type outer damper. Similarly, the annular inner bridge member 94 of FIG. 6 includes the inner bridge member openings 95, and as can be seen in FIG. 6, a plurality of the inner bridge member openings 95 may be circumferentially spaced about the combustor centerline 112 through the annular inner bridge member 94. The annular inner liner 52 is also seen to include a plurality of the inner dilution openings 90 that are circumferentially spaced about the combustor centerline 112 through the annular inner liner 52. In addition, the annular inner liner 52 is seen to include a plurality of the inner acoustic damper inlet feed members 103 circumferentially spaced about the combustor centerline 112. Thus, in FIG. 6, the inner acoustic damper 145 is arranged as an annular type inner damper.

In contrast to the FIG. 6 arrangement of an annular type outer damper and an annular type inner damper, FIG. 7 depicts an arrangement that includes a plurality of the outer acoustic dampers 143 arranged circumferentially about the combustor centerline 112, and a plurality of the inner acoustic dampers 145 arranged circumferentially about the combustor centerline 112. In FIG. 7, the outer damper bridge member 92 does not necessarily extend annularly along the entire radially outer surface 152 of the outer liner 54 (although it may), but rather, may extend partially about the radially outer surface 152. Thus, to form the outer acoustic damper 143, a plurality of outer damper sidewalls 224 are provided to extend between the outer damper bridge member 92 and the outer liner 54 from the OCD section upstream end 108 to the OCD section downstream end 120. As a result, the outer damper cavity 96 is formed by the outer damper bridge member 92, the OCD section 102, and the outer damper sidewalls 224, with the outer acoustic damper inlet feed member 101 providing the acoustic oscillations to the outer damper cavity 96. Similarly, the inner damper bridge member 94 does not extend annularly along the entire radially inner surface 158 of the inner liner 52 (although again, it may), but rather, extends partially about the radially inner surface 158. Thus, to form the inner acoustic damper 145, a plurality of inner damper sidewalls 226 are provided to extend between the inner damper bridge member 94 and the inner liner 52 from the ICD section upstream end 128 to the ICD section downstream end 138. As a result, the inner damper cavity 97 is formed by the inner damper bridge member 94, the ICD section 104, and the inner damper sidewalls 226, with the inner damper inlet feed member 103 providing the acoustic oscillations to the inner damper cavity 97. With the arrangement of FIG. 7, a plurality of outer damper-free portions 228 may defined between successive outer acoustic dampers 143, where each outer damper-free portion 228 may include the outer dilution opening 88 therethrough. Similarly, a plurality of inner damper-free portions 230 are defined between successive inner acoustic dampers 145, where each inner damper-free portion 230 may include an inner dilution opening 90 therethrough.

As an alternative arrangement in FIG. 7, the outer damper bridge member 92 may extend about the entire circumference of the outer liner 54 as shown in FIG. 6, but sidewalls similar to those of FIG. 7 may be implemented. As an example, FIG. 7 shows an arrangement were the outer bridge member 92 extends circumferentially to be shared by a first outer damper 232, a second outer damper 234 and a third outer damper 238. A first common sidewall 236 may be implemented between the first outer damper 232 and the second outer damper 234, while a second common sidewall 240 may be implemented between the second outer damper 234 and the third outer damper 238. Such an arrangement of shared common sidewalls may be implemented about the entire circumference of the annular outer liner 54, so as to define a plurality of outer dampers about the outer liner 54. Each outer damper in this type of arrangement may have a different size so as to dampen different frequencies. For instance, as seen in FIG. 7, the first outer damper 232 and the third outer damper 238 may be of the same size, while the second outer damper 234 may be smaller than the first outer damper 232 and the third outer damper 238. Of course, while not shown in FIG. 7, the inner liner 52 may include a similar type of arrangement, where the inner bridge member 94 extends circumferentially about the combustor centerline 112, but shared common sidewalls are provided to define a plurality of inner dampers.

While the forgoing description is directed to an annular type combustor having both an inner liner and an outer liner, the present disclosure is equally applicable to other types of combustors. For example, the OCD section 102 could be implemented as a single annular liner that is part of a can type combustor. It can also be readily understood that, with the aspect depicted in FIG. 5, existing non-converging-diverging type liners could be readily retrofitted with the outer converging-diverging section 143 and the inner converging-diverging section 145, and, thus, the inclusion of the outer acoustic damper 194 and the inner acoustic damper 196.

Figure 8:
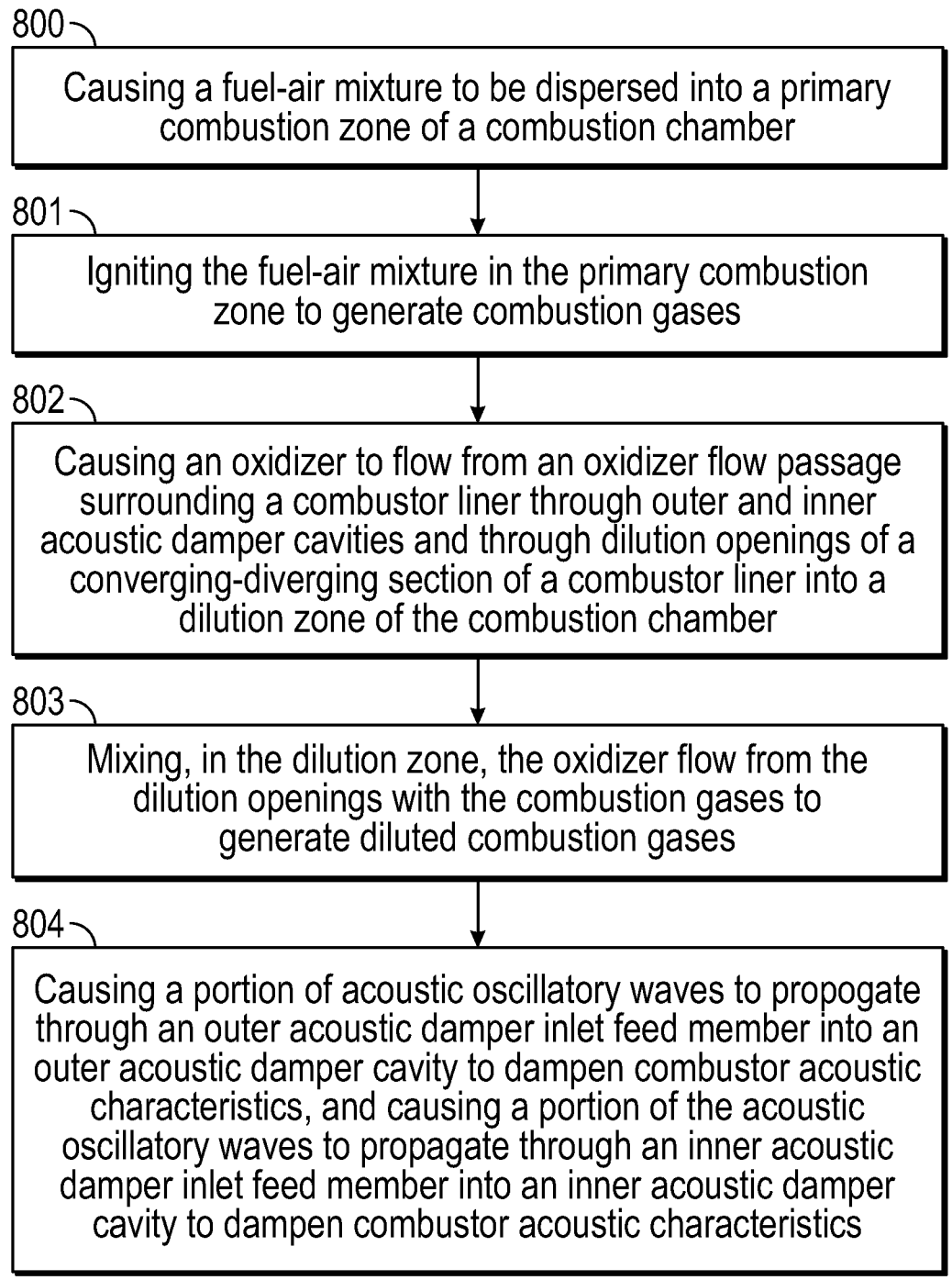
FIG. 8 is a flowchart depicting process steps of a method of operating a combustion section, according to an aspect of the present disclosure.

Referring now to FIG. 8, depicted therein is a flowchart of steps for a method of operating the combustion section 26 of the gas turbine engine 10. The method according the present aspect is essentially operating the combustion section 26 having any of the foregoing configurations as shown and described above with regard to FIGS. 1 to 7. Thus, in one aspect, the method operates the combustion section 26 that includes the combustor 50 having the combustor liner 51 that includes the outer liner 54, including the OCD section 102, which has the outer dilution openings 88 through the OCD section 102, and the outer acoustic damper inlet feed member 101. The combustor liner 51 also includes the inner liner 52, having the ICD section 104, which has the inner dilution opening 90 therethrough, and the inner acoustic damper inlet feed member 103. The combustor assembly 50 further includes the outer bridge member 92 defining a bridge across the OCD section 102, and having the at least one outer bridge opening 93 therethrough, where the outer bridge member 92 and the OCD section 102 having the outer acoustic damper inlet feed member 101 at least partially defines the outer acoustic damper 143. Further, the combustor assembly 50 has the inner bridge member 94 defining a bridge across the ICD section 104, where the inner bridge member 93 includes at least one inner bridge opening 95 therethrough, where the inner bridge member 93 and the ICD section 104 having the inner acoustic damper inlet feed member 103 at least partially defines the inner acoustic damper 145.

The combustion section 26 for the disclosed method further includes the outer casing 64 surrounding the combustor liner 51, with the inner and outer oxidizer flow passages 68/69 defined between the combustor liner 51 and the outer casing 64, and a fuel-air mixer assembly 60 connected at an upstream end of the combustor liner 51, wherein a combustion chamber 62 is defined between the outer liner 54 and the inner liner 52 of the combustor liner 51.

With the foregoing combustion section 26 being so provided, the method of operating the combustion section 26 will now be described. Referring to FIG. 8, a first step 800 of the disclosed method entails causing a flow of a fuel-air mixture to be dispersed from the fuel-air mixer assembly 60 into a primary combustion zone 70 of the combustion chamber 62, and a second step 801 includes igniting the flow of the fuel-air mixture in the primary combustion zone 70 of the combustion chamber 62 to generate combustion gases 86. As was described above, a first portion of the compressed air 82, as indicated schematically by arrows 82(*a*) in FIG. 2, flows from the diffuser cavity 84 through an opening of the cowl 57 and into pressure plenum 65, where it is then swirled by, and mixed with fuel provided by fuel nozzle assembly 58, fuel-air mixer assembly 60 to generate a swirled fuel-air mixture that is then ignited and burned to generate combustion gases 86 within the primary combustion zone 70 of the combustor assembly 50.

Step 802 of the method entails causing an oxidizer (e.g., compressed air 82(*c*)) to flow from the outer flow passage 68 through the at least one outer dilution opening 88 of the OCD section 102 into the dilution zone 72 of the combustion chamber 62, and causing the dilution oxidizer gas (e.g., compressed air 82(*c*)) to flow from the inner flow passage 69 through the at least one inner dilution opening 90 of the ICD section 104 into the dilution zone 72 of the combustion chamber 62. Step 803 of the method entails mixing, in the dilution zone 72 of the combustion chamber 62, the oxidizer flow through the at least one outer dilution opening 88 and the oxidizer flow through the at least one inner dilution opening 90, with the combustion gases 86 from the primary combustion zone 70 to generate diluted combustion gases 87. For steps 802 and 803, as was described above with regard to FIG. 2, a second portion of the compressed air 82, as indicated schematically by arrows 82(*b*), may be used for various purposes other than combustion. For example, as shown in FIG. 2, compressed air 82(*b*) may be routed into the outer flow passage 68 and into the inner flow passage 69. A portion of the compressed air 82(*b*) may then be routed through the outer bridge openings 93 into outer acoustic damper cavity 96 and through outer dilution openings 88 (schematically shown as compressed air 82(*c*)) and into the dilution zone 72 of combustion chamber 62 to provide quenching of the combustion gases 86 in dilution zone 72 so as to generate diluted combustion gases 87, and may also provide turbulence to the flow of combustion gases 86 so as to provide better mixing of the dilution oxidizer gas (e.g., compressed air 82(*c*)) with the combustion gases 86. A similar flow of the compressed air 82(*c*) from the inner flow passage 69 flows through the inner bridge openings 95 into inner acoustic damper cavity 97 and through the inner dilution openings 90 into the dilution zone 72 of the combustion chamber 62.

The next part of the method relates to dampening the acoustic characteristics of the combustion section 26 that are created by the combustion process. The dampening occurs via the operation of the outer acoustic damper 143 and the inner acoustic damper 145. Thus, in operation, a step 804 entails causing a portion of the acoustic oscillatory waves to propagate through at least one outer acoustic damper inlet feed member 101, which is disposed on the downstream portion of the OCD section 102, into the outer acoustic damper cavity 96 of the outer acoustic damper 143 to dampen acoustic characteristics of the combustor. Similarly, step 804 also entails causing a portion of the acoustic oscillatory waves to propagate through at least one inner acoustic damper inlet feed member 103, which is disposed on the downstream portion of the ICD section 104, into the inner acoustic damper cavity 97 of the inner acoustic damper 145 to dampen the acoustic characteristics of the combustor. In step 804, the outer acoustic damper 143 may dampen the acoustic characteristics of the combustor assembly 50 at a first frequency, and the inner acoustic damper 145 may dampen the acoustic characteristics of the combustor assembly 50 at a second frequency. In the exemplary combustor 50 of the present disclosure, acoustic characteristics may be found to range from two-hundred hertz to sixteen-hundred hertz. Of course, acoustic characteristics in other frequencies may occur in combustors and the forgoing range is merely exemplary. Thus, with the foregoing exemplary frequency range, the outer acoustic damper 143 may be configured such that the first frequency has a range from two-hundred hertz to eight-hundred hertz, while the inner acoustic damper 145 may be configured such that the second frequency has a range from eight-hundred hertz to sixteen-hundred hertz. With this arrangement, each damper can be tuned to dampen different acoustic characteristic frequencies. Of course, the outer acoustic damper 143 may instead be configured to have the first frequency in a range from eight-hundred hertz to sixteen-hundred hertz and the inner acoustic damper 145 may be configures to have the second frequency in a range from two-hundred hertz to eight-hundred hertz.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A combustor liner for a combustor of a gas turbine, the combustor liner comprising an outer liner; and an inner liner, the outer liner and the inner liner defining a combustion chamber therebetween, wherein, at least one of the outer liner and the inner liner comprises a converging-diverging (CD) section extending into the combustion chamber and including at least one dilution opening through the CD section, the CD section further including at least one acoustic damper inlet feed member extending through a downstream portion of the CD section, and a bridge member defining a bridge extending across the CD section, the bridge member including at least one bridge opening therethrough, the bridge member and the CD section defining an acoustic damper.

The combustor according to the preceding clause, wherein both the outer liner and the inner liner comprise the CD section and the bridge member, the CD section of the outer liner comprising an outer converging-diverging (OCD) section, the at least one acoustic damper inlet feed member of the outer liner comprising at least one outer acoustic damper inlet feed member, an upstream portion of the OCD section extending radially inward and downstream along a longitudinal direction with respect to a combustor centerline, and a downstream portion of the OCD section extending radially outward and downstream along the longitudinal direction with respect to the combustor centerline, and the CD section of the inner liner comprising an inner converging-diverging (ICD) section, the at least one acoustic damper inlet feed member of the inner liner comprising at least one inner acoustic damper inlet feed member, an upstream portion of the ICD section extending radially outward and downstream along the longitudinal direction with respect to the combustor centerline, and a downstream portion of the ICD section extending radially inward and downstream along the longitudinal direction with respect to the combustor centerline, the bridge member of the outer liner comprises an outer bridge member extending at least partially in the longitudinal direction and defining a bridge across the OCD section, the outer bridge member including at least one outer bridge opening therethrough, the outer bridge member and the OCD section defining an outer acoustic damper; and the bridge member of the inner liner comprising an inner bridge member extending at least partially in the longitudinal direction and defining a bridge across the ICD section, the inner bridge member including at least one inner bridge opening therethrough, the inner bridge member and the ICD section defining an inner acoustic damper.

The combustor liner according to any preceding clause, wherein the outer acoustic damper comprises at least one outer damping cavity shield disposed between the OCD section and the outer bridge member, and having an outer damping cavity shield dilution opening therethrough, and wherein the inner acoustic damper comprises at least one inner damping cavity shield disposed between the ICD section and the inner bridge member, and having an inner damper cavity shield dilution opening therethrough.

The combustor liner according to any preceding clause, wherein the OCD section is defined by the outer liner, and the outer bridge member is connected to a radially outer surface of the outer liner so as to bridge across the OCD section, and wherein the ICD section is defined by the inner liner, and the inner bridge member is connected to a radially inner surface of the inner liner so as to bridge across the ICD section.

The combustor liner according to any preceding clause, further comprising at least one outer bridge support member connecting the OCD section and the outer bridge member within the outer acoustic damper, and at least one inner bridge support member connecting the ICD section and the inner bridge member within the inner acoustic damper.

The combustor liner according to any preceding clause, wherein the outer bridge member is defined by the outer liner, and the OCD section is connected to a radially inner surface of the outer liner, and wherein the inner bridge member is defined by the inner liner, and the ICD section is connected to a radially outer surface of the inner liner.

The combustor according to any preceding clause, wherein the outer acoustic damper is a Helmholtz acoustic damper, and the inner acoustic damper is a Helmholtz acoustic damper.

The combustor liner according to any preceding clause, wherein the at least one outer acoustic damper inlet feed member includes an outer damper neck with an inlet orifice therethrough, the inlet orifice of the outer damper neck defining a cross-sectional area thereof, and the at least one inner acoustic damper inlet feed member includes an inner damper neck with an inlet orifice therethrough, the inlet orifice of the inner damper neck defining a cross-sectional area thereof.

The combustor according to any preceding clause, wherein the outer damper neck extends at least partially radially inward from the OCD section into the combustion chamber, and wherein the inner damper neck extends at least partially radially inward from the ICD section into the combustion chamber.

The combustor according to any preceding clause, wherein the OCD section comprises (i) an OCD section converging portion converging radially inward and longitudinally downstream, with respect to the combustor centerline, into the combustion chamber from an upstream end of the OCD section to an upstream end of an OCD section transition portion, (ii) an OCD section diverging portion extending radially outward and longitudinally downstream, with respect to the combustor centerline, from a downstream end of the OCD section transition portion to a downstream end of the OCD section, and (iii) the OCD section transition portion connecting a downstream end of the OCD section converging portion and an upstream end of the OCD section diverging portion, and the ICD section comprises (i) an ICD section converging portion converging radially outward and longitudinally downstream, with respect to the combustor centerline, into the combustion chamber from an upstream end of the ICD section to an upstream end of an ICD section transition portion, (ii) an ICD section diverging portion extending radially inward and longitudinally downstream, with respect to the combustor centerline, from a downstream end of the ICD section transition portion to a downstream end of the ICD section, and (iii) the ICD section transition portion connecting a downstream end of the ICD section converging portion and an upstream end of the ICD section diverging portion.

The combustor liner according to any preceding clause, wherein the OCD section includes at least one outer acoustic damper inlet feed member through the OCD section diverging portion, and the ICD section includes at least one inner acoustic damper inlet feed member through the ICD section diverging portion.

The combustor liner according to any preceding clause, wherein the at least one outer dilution opening comprises a plurality of outer dilution holes circumferentially arranged about the combustor centerline, the plurality of outer dilution holes providing a dilution flow of an oxidizer therethrough to a dilution zone of the combustion chamber, the dilution zone defined at least partially between the OCD section and the ICD section, wherein the at least one inner dilution opening comprises a plurality of inner dilution holes circumferentially arranged about the combustor centerline, the plurality of inner dilution holes providing a flow of the oxidizer therethrough to the dilution zone of the combustion chamber.

The combustor liner according to any preceding clause, wherein the plurality of outer dilution holes are arranged through the OCD section transition portion, and the plurality of inner dilution holes are arranged through the ICD section transition portion.

The combustor liner according to any preceding clause, wherein the OCD section further includes a plurality of cooling holes through at least one of the OCD section converging portion and the OCD section transition portion, and the ICD section further includes a plurality of cooling holes through at least one of the ICD section converging portion and the ICD section transition portion.

The combustor according to any preceding clause, wherein a length of the outer damper neck and the cross-sectional area of the outer damper neck are configured to dampen, based on a volume of the outer acoustic damper, acoustic characteristics of the combustor in a range from two-hundred hertz to eight-hundred hertz, or in a range from eight-hundred hertz to sixteen-hundred hertz, and a length and cross-sectional area of the inner damper neck are configured to dampen, based on a volume of the inner acoustic damper, acoustic characteristics of the combustor in a range from two-hundred hertz to eight-hundred hertz, or in a range from eight-hundred hertz to sixteen-hundred hertz.

The combustor according to any preceding clause, wherein the outer bridge member extends circumferentially about the combustor centerline such that the outer acoustic damper comprises an annular outer acoustic damper that extends circumferentially about the combustor centerline, and the inner bridge member extends circumferentially about the combustor centerline such that the inner acoustic damper comprises an annular inner acoustic damper that extends circumferentially about the combustor centerline.

The combustor according to any preceding clause, wherein the combustor includes a plurality of the outer acoustic dampers arranged circumferentially about the combustor centerline, and a plurality of inner acoustic dampers arranged circumferentially about the combustor centerline, each of the plurality of the outer acoustic dampers including a plurality of outer damper sidewalls connecting the outer bridge member and the OCD section to define the outer acoustic damper therewithin, and each of the plurality of the inner acoustic dampers including a plurality of inner damper sidewalls connecting the inner bridge member and the ICD section to define the inner acoustic damper therewithin.

A method of operating a combustion section of a gas turbine, the combustion section comprising (i) a combustor liner including (a) an outer liner, (b) an inner liner, the outer liner and the inner liner defining a combustion chamber therebetween, (c) an outer converging-diverging (OCD) section extending into the combustion chamber and including at least one outer dilution opening through the OCD section, the OCD section further including an outer acoustic damper inlet feed member extending through a downstream portion of the OCD section, (d) an inner converging-diverging (ICD) section extending into the combustion chamber and including at least one inner dilution opening through the ICD section, the ICD section further including an inner acoustic damper inlet feed member extending through the downstream portion of the ICD section, (e) an outer bridge member defining a bridge across the OCD section so as to define an outer acoustic damper cavity therebetween, the outer bridge member including at least one outer bridge opening therethrough, the outer bridge member and the OCD section defining an outer acoustic damper, and (f) an inner bridge member defining a bridge across the ICD section so as to define an inner acoustic damper cavity therebetween, the inner bridge member including at least one inner bridge opening therethrough, the inner bridge member and the ICD section defining an inner acoustic damper, (ii) an outer casing surrounding the combustor liner, an oxidizer flow passage defined between the combustor liner and the outer casing, and (iii) a fuel-air mixer assembly connected at an upstream end of the combustor liner, the method comprising causing a flow of a fuel-air mixture to be dispersed from the fuel-air mixer assembly into a primary combustion zone of the combustion chamber, igniting the flow of the fuel-air mixture in the primary combustion zone of the combustion chamber to generate combustion gases in the primary combustion zone, causing an oxidizer to flow from the oxidizer flow passage through at least one outer dilution opening of the OCD section into a dilution zone of the combustion chamber disposed between the OCD section and the ICD section, and causing the oxidizer to flow from the oxidizer flow passage through at least one inner dilution opening of the ICD section into the dilution zone of the combustion chamber, mixing, in the dilution zone of the combustion chamber, the oxidizer flow through the at least one outer dilution opening and the oxidizer flow through the at least one inner dilution opening, with the combustion gases of the primary combustion zone to generate diluted combustion gases, and causing a portion of acoustic oscillatory waves to propagate through at least one outer acoustic damper inlet feed member into the outer acoustic damper cavity of the outer acoustic damper to dampen acoustic characteristics of the combustor, and causing a portion of the acoustic oscillatory waves to propagate through at least one inner acoustic damper inlet feed member into the inner acoustic damper cavity of the inner acoustic damper to dampen the acoustic characteristics of the combustor.

The method according to the preceding clause, wherein the outer acoustic damper dampens the acoustic characteristics of the combustor at a first frequency, and the inner acoustic damper dampens the acoustic characteristics of the combustor at a second frequency.

The method according to any preceding clause, wherein the first frequency has a range from two-hundred hertz to eight-hundred hertz, and the second frequency has a range from eight-hundred hertz to sixteen-hundred hertz, or the first frequency has a range from eight-hundred hertz to sixteen-hundred hertz and the second frequency has a range from two-hundred hertz to eight-hundred hertz.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor liner for a combustor of a gas turbine, the combustor liner comprising:
   an outer liner; and
   an inner liner, the outer liner and the inner liner defining a combustion chamber therebetween,
   wherein, at least one of the outer liner or the inner liner comprises:
   (a) a converging-diverging (CD) section extending circumferentially about a combustor centerline axis and extending into the combustion chamber and including at least one dilution opening through the CD section, the CD section further including at least one acoustic damper inlet feed member extending through a downstream portion of the CD section, and
   (b) a bridge member defining a bridge extending across the CD section, the bridge member including at least one bridge opening therethrough, the bridge member and the CD section defining an acoustic damper cavity therebetween, wherein the at least one bridge opening provides a flow of air therethrough to the acoustic damper cavity, the at least one dilution opening provides a flow of dilution air from the acoustic damper cavity into the combustion chamber, and the at least one acoustic damper inlet feed member provides an inlet flow of acoustic oscillatory waves into the acoustic damper cavity from the combustion chamber.

2. The combustor according to claim 1, wherein both the outer liner and the inner liner comprise the CD section and the bridge member,
   the CD section of the outer liner comprising an outer converging-diverging (OCD) section, the at least one acoustic damper inlet feed member of the outer liner comprising at least one outer acoustic damper inlet feed member, an upstream portion of the OCD section extending radially inward and downstream along a longitudinal direction with respect to a combustor centerline, and a downstream portion of the OCD section extending radially outward and downstream along the longitudinal direction with respect to the combustor centerline, and the CD section of the inner liner comprising an inner converging-diverging (ICD) section, the at least one acoustic damper inlet feed member of the inner liner comprising at least one inner acoustic damper inlet feed member, an upstream portion of the ICD section extending radially outward and downstream along the longitudinal direction with respect to the combustor centerline, and a downstream portion of the ICD section extending radially inward and downstream along the longitudinal direction with respect to the combustor centerline, the bridge member of the outer liner comprises an outer bridge member extending at least partially in the longitudinal direction and defining a bridge across the OCD section, the outer bridge member including at least one outer bridge opening therethrough, the outer bridge member and the OCD section defining an outer acoustic damper; and the bridge member of the inner liner comprising an inner bridge member extending at least partially in the longitudinal direction and defining a bridge across the ICD section, the inner bridge member including at least one inner bridge opening therethrough, the inner bridge member and the ICD section defining an inner acoustic damper.

3. The combustor according to claim 2, wherein the outer bridge member extends circumferentially about the combustor centerline such that the outer acoustic damper comprises an annular outer acoustic damper that extends circumferentially about the combustor centerline, and the inner bridge member extends circumferentially about the combustor centerline such that the inner acoustic damper comprises an annular inner acoustic damper that extends circumferentially about the combustor centerline.

4. The combustor according to claim 2, wherein the combustor includes a plurality of the outer acoustic dampers arranged circumferentially about the combustor centerline, and a plurality of inner acoustic dampers arranged circumferentially about the combustor centerline, each of the plurality of the outer acoustic dampers including a plurality of outer damper sidewalls connecting the outer bridge member and the OCD section to define the outer acoustic damper therewithin, and each of the plurality of the inner acoustic dampers including a plurality of inner damper sidewalls connecting the inner bridge member and the ICD section to define the inner acoustic damper therewithin.

5. The combustor liner according to claim 2, wherein the outer acoustic damper comprises at least one outer damping cavity shield disposed between the OCD section and the outer bridge member, and having an outer damping cavity shield dilution opening therethrough, and wherein the inner acoustic damper comprises at least one inner damping cavity shield disposed between the ICD section and the inner bridge member, and having an inner damper cavity shield dilution opening therethrough.

6. The combustor liner according to claim 2, wherein the OCD section is defined by the outer liner, and the outer bridge member is connected to a radially outer surface of the outer liner so as to bridge across the OCD section, and wherein the ICD section is defined by the inner liner, and the inner bridge member is connected to a radially inner surface of the inner liner so as to bridge across the ICD section.

7. The combustor liner according to claim 6, further comprising at least one outer bridge support member connecting the OCD section and the outer bridge member within the outer acoustic damper, and at least one inner bridge support member connecting the ICD section and the inner bridge member within the inner acoustic damper.

8. The combustor liner according to claim 2, wherein the outer bridge member is defined by the outer liner, and the OCD section is connected to a radially inner surface of the outer liner, and wherein the inner bridge member is defined by the inner liner, and the ICD section is connected to a radially outer surface of the inner liner.

9. The combustor according to claim 2, wherein the outer acoustic damper is a Helmholtz acoustic damper, and the inner acoustic damper is a Helmholtz acoustic damper.

10. The combustor liner according to claim 2, wherein the at least one outer acoustic damper inlet feed member includes an outer damper neck with an inlet orifice therethrough, the inlet orifice of the outer damper neck defining a cross-sectional area thereof, and the at least one inner acoustic damper inlet feed member includes an inner damper neck with an inlet orifice therethrough, the inlet orifice of the inner damper neck defining a cross-sectional area thereof.

11. The combustor according to claim 10, wherein the outer damper neck extends at least partially radially inward from the OCD section into the combustion chamber, and wherein the inner damper neck extends at least partially radially inward from the ICD section into the combustion chamber.

12. The combustor according to claim 2, wherein the OCD section comprises:

(i) an OCD section converging portion converging radially inward and longitudinally downstream, with respect to the combustor centerline, into the combustion chamber from an upstream end of the OCD section to an upstream end of an OCD section transition portion, (ii) an OCD section diverging portion extending radially outward and longitudinally downstream, with respect to the combustor centerline, from a downstream end of the OCD section transition portion to a downstream end of the OCD section, and (iii) the OCD section transition portion connecting a downstream end of the OCD section converging portion and an upstream end of the OCD section diverging portion, and the ICD section comprises:

(i) an ICD section converging portion converging radially outward and longitudinally downstream, with respect to the combustor centerline, into the combustion chamber from an upstream end of the ICD section to an upstream end of an ICD section transition portion, (ii) an ICD section diverging portion extending radially inward and longitudinally downstream, with respect to the combustor centerline, from a downstream end of the ICD section transition portion to a downstream end of the ICD section, and (iii) the ICD section transition portion connecting a downstream end of the ICD section converging portion and an upstream end of the ICD section diverging portion.

13. The combustor liner according to claim 12, wherein the OCD section includes at least one outer acoustic damper inlet feed member through the OCD section diverging portion, and
the ICD section includes at least one inner acoustic damper inlet feed member through the ICD section diverging portion.

14. The combustor liner according to claim 13, wherein the at least one outer dilution opening comprises a plurality of outer dilution holes circumferentially arranged about the combustor centerline, the plurality of outer dilution holes providing a dilution flow of an oxidizer therethrough to a dilution zone of the combustion chamber, the dilution zone defined at least partially between the OCD section and the ICD section,
wherein the at least one inner dilution opening comprises a plurality of inner dilution holes circumferentially arranged about the combustor centerline, the plurality of inner dilution holes providing a flow of the oxidizer therethrough to the dilution zone of the combustion chamber.

15. The combustor liner according to claim 14, wherein the plurality of outer dilution holes are arranged through the OCD section transition portion, and the plurality of inner dilution holes are arranged through the ICD section transition portion.

16. The combustor liner according to claim 15, wherein the OCD section further includes a plurality of cooling holes through at least one of the OCD section converging portion or the OCD section transition portion, and the ICD section further includes a plurality of cooling holes through at least one of the ICD section converging portion or the ICD section transition portion.

17. The combustor according to claim 11, wherein a length of the outer damper neck and the cross-sectional area of the outer damper neck are configured to dampen, based on a volume of the outer acoustic damper, acoustic characteristics of the combustor in a range from two-hundred hertz to eight-hundred hertz, or in a range from eight-hundred hertz to sixteen-hundred hertz, and a length and cross-sectional area of the inner damper neck are configured to dampen, based on a volume of the inner acoustic damper, acoustic characteristics of the combustor in a range from two-hundred hertz to eight-hundred hertz, or in a range from eight-hundred hertz to sixteen-hundred hertz.

18. A method of operating a combustion section of a gas turbine, the combustion section comprising (i) a combustor liner including (a) an outer liner, (b) an inner liner, the outer liner and the inner liner defining a combustion chamber therebetween, (c) an outer converging-diverging (OCD) section extending circumferentially about a combustor centerline axis and extending into the combustion chamber and including at least one outer dilution opening through the OCD section, the OCD section further including an outer acoustic damper inlet feed member extending through a downstream portion of the OCD section, (d) an inner converging-diverging (ICD) section extending circumferentially about the combustor centerline axis and extending into the combustion chamber and including at least one inner dilution opening through the ICD section, the ICD section further including an inner acoustic damper inlet feed member extending through the downstream portion of the ICD section, (e) an outer bridge member defining a bridge across the OCD section so as to define an outer acoustic damper cavity therebetween, the outer bridge member including at least one outer bridge opening therethrough, the outer bridge member and the OCD section defining an outer acoustic damper, and (f) an inner bridge member defining a bridge across the ICD section so as to define an inner acoustic damper cavity therebetween, the inner bridge member including at least one inner bridge opening therethrough, the inner bridge member and the ICD section defining an inner acoustic damper, (ii) an outer casing surrounding the combustor liner, an oxidizer flow passage defined between the combustor liner and the outer casing, and (iii) a fuel-air mixer assembly connected at an upstream end of the combustor liner, the method comprising:
causing a flow of a fuel-air mixture to be dispersed from the fuel-air mixer assembly into a primary combustion zone of the combustion chamber;
igniting the flow of the fuel-air mixture in the primary combustion zone of the combustion chamber to generate combustion gases in the primary combustion zone;
causing (1) an oxidizer to flow from the oxidizer flow passage through the at least one outer bridge opening into the outer acoustic damper cavity, and from the outer acoustic damper cavity through the at least one outer dilution opening of the OCD section into a dilution zone of the combustion chamber disposed between the OCD section and the ICD section, and causing (2) the oxidizer to flow from the oxidizer flow passage through the at least one inner bridge opening into the inner acoustic damper cavity, and from the inner acoustic damper cavity through the at least one inner dilution opening of the ICD section into the dilution zone of the combustion chamber;
mixing, in the dilution zone of the combustion chamber, the oxidizer flow through the at least one outer dilution opening and the oxidizer flow through the at least one inner dilution opening, with the combustion gases of the primary combustion zone to generate diluted combustion gases; and
causing a portion of acoustic oscillatory waves to propagate through the at least one outer acoustic damper inlet feed member into the outer acoustic damper cavity of the outer acoustic damper to dampen acoustic characteristics of the combustor, and causing a portion of the acoustic oscillatory waves to propagate through the at least one inner acoustic damper inlet feed member into the inner acoustic damper cavity of the inner acoustic damper to dampen the acoustic characteristics of the combustor.

19. The method according to claim 18, wherein the outer acoustic damper dampens the acoustic characteristics of the combustor at a first frequency, and the inner acoustic damper dampens the acoustic characteristics of the combustor at a second frequency.

20. The method according to claim 19, wherein the first frequency has a range from two-hundred hertz to eight-hundred hertz, and the second frequency has a range from eight-hundred hertz to sixteen-hundred hertz, or the first frequency has a range from eight-hundred hertz to sixteen-hundred hertz and the second frequency has a range from two-hundred hertz to eight-hundred hertz.

\* \* \* \* \*